United States Patent
Knight et al.

(10) Patent No.: US 7,272,642 B2
(45) Date of Patent: Sep. 18, 2007

(54) DETECTING A REVERSE PROXY AND ESTABLISHING A TUNNELED CONNECTION THERETHROUGH

(75) Inventors: Keith Bryan Knight, Lexington, KY (US); James Winston Lawwill, Jr., Winchester, KY (US); Brian L. Pulito, Lexington, KY (US)

(73) Assignee: International Business Machines Corporation, Armonk, NY (US)

(*) Notice: Subject to any disclaimer, the term of this patent is extended or adjusted under 35 U.S.C. 154(b) by 759 days.

(21) Appl. No.: 10/679,842

(22) Filed: Oct. 6, 2003

(65) Prior Publication Data

US 2005/0091341 A1    Apr. 28, 2005

(51) Int. Cl.
*G06F 15/16*   (2006.01)

(52) U.S. Cl. ............ 709/218; 709/227; 709/228; 709/238

(58) Field of Classification Search ......... 709/200, 709/203, 217–219, 227–229, 223–224, 238
See application file for complete search history.

(56) References Cited

OTHER PUBLICATIONS

Pulito, Brian; *Connectivity and Multimedia Protocols*; LDN Archives, Sep. 21, 2003.
Author Unknown; *Sametime Connect client connection process (using the Internet Explorer browser settings)*, Oct. 2, 2003.

*Primary Examiner*—Saleh Najjar
*Assistant Examiner*—Faruk Hamza
(74) *Attorney, Agent, or Firm*—Stephen T. Keohane, Esq.; Steven M. Greenberg, Esq.; Carey Rodriguez Greenberg & Paul LLP

(57) ABSTRACT

A method, system and apparatus for managing an interposed reverse proxy. The method can include comparing within a markup language document, a host address for the markup language document and a codebase address for a code base supporting logic disposed within the markup language document. If the host address and the codebase address differ, it can be concluded that a reverse proxy has obscured from view a server source of the markup language document. The method of the invention further can include retrieving a server affinity identifier for the server source from the configuration tags for the logic. Responsive to concluding that a reverse proxy has obscured from view a server source of the markup language document, a tunneled connection to the server source can be attempted through the reverse proxy by inserting the server affinity identifier in an address specified in the attempt.

6 Claims, 2 Drawing Sheets

DETECTING A REVERSE PROXY AND ESTABLISHING A TUNNELED CONNECTION THERETHROUGH

BACKGROUND OF THE INVENTION

1. Statement of the Technical Field

The present invention relates to the field of network connectivity and multimedia protocols and more particularly to managing connectivity through a reverse proxy.

2. Description of the Related Art

The rapid development of the Internet has led to advanced modes of communication and collaboration. Using the Internet as a backbone, individuals worldwide can converge in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. Nevertheless, the real-time delivery requirements of audio and video have strained the infrastructure of the Internet in its ability to support multimedia collaboration.

Along with the dramatic rise in Internet usage over the past decade, a correspondingly dramatic increase in hacking and unauthorized accessing of data over the Internet has been observed. In response, contemporary network architecture theory incorporates network elements tasked with the security of discrete portions of the Internet. Typical network elements include firewalls, SOCKS proxies, HTTP proxies, network obfuscation units such as network and port address translation, and the like. The use of these network elements, however, can complicate the accommodation of collaborative computing technologies. In particular, the disposition of a security device in the path of real-time data transmissions can interrupt if not completely block the flow of the real-time data from source to sink.

One type of network security element, the reverse proxy, can be used to protect a cluster of servers from discretionary access by clients residing in the Internet. The reverse proxy can protect the cluster of servers by forcing external clients to connect to individual servers within the cluster only through the reverse proxy. The reverse proxy itself can manage authentication, address translation and monitoring of data flowing through the reverse proxy in order to ensure protocol integrity. In this regard, the reverse proxy only can support the HTTP protocol.

Real-time Internet conferencing technologies rely heavily upon asynchronous message exchanges between client and server. To support receiving asynchronous messages from the server, a real-time conferencing client must maintain a persistent connection to the server. When a reverse proxy has been disposed between the real-time conferencing client and the conferencing server, data can be transferred between client and server only by simulating a persistent connection using the HTTP protocol. Simulating a persistent connection, however, can be difficult where embedded hyperlinks to active code within markup served across the reverse proxy do not comport with the proxy rules required to route requests to servers behind the reverse proxy. In this circumstance, from the perspective of the real-time conferencing client, the conferencing server will appear to be unavailable.

SUMMARY OF THE INVENTION

The present invention addresses the deficiencies of the art in respect to handling the presence of an interposed reverse proxy and provides a novel and non-obvious method, system and apparatus for detecting a reverse proxy and establishing a tunneled connection therethrough. In a first aspect of the present invention, a method for managing an interposed reverse proxy can include comparing within a markup language document, a host address for the markup language document and an applet address for a code base supporting an applet disposed within the markup language document. If the host address and the applet address differ, it can be concluded that a reverse proxy has obscured from view a server source of the markup language document.

Importantly, the method of the invention further can include retrieving a server affinity identifier for the server to connect to from the applet tags. Responsive to concluding that a reverse proxy has obscured from view a server source of the markup language document, a tunneled connection to the server source can be attempted through the reverse proxy by inserting the server affinity identifier in an address specified in the attempt. In this regard, the retrieving step can further include the step of locating the server affinity identifier within a tag disposed within the applet. Moreover, the attempting step can include combining an address for the reverse proxy with the server affinity identifier and a string specifying a particular desired resource within the server source. Subsequently, an HTTP compliant request can be formed using the combined address and non-HTTP data can be encapsulated within the HTTP compliant request. Finally, the HTTP compliant request can be forwarded to the reverse proxy.

In a system for managing a reverse proxy interposed between a client and server, the system can include both detection logic and simulation logic. The detection logic can be disposed within the client and can be programmed to detect the interposed reverse proxy by comparing host and applet addresses embedded within content provided by the server. The simulation logic, by comparison, similarly can be disposed within the client and can respond to the detection logic by selectively incorporating a server affinity identifier in requests addressed to the interposed reverse proxy to ensure re-routing to the server. Preferably, both the detection and simulation logic can be embodied in an applet executing within a virtual machine disposed within the client. Moreover, the simulation logic can include HTTP tunneling logic for establishing a tunneled connection through the reverse proxy to the server.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for detecting the presence of a reverse proxy disposed within a client-server configuration and responding to the detection of the reverse proxy by maintaining a virtual persistent communicative connection between the client and server despite the disposition of the reverse proxy. In accordance with the present invention, the presence of a reverse proxy can be detected when the base addressing for embedded logic varies from the base addressing of the document in which the logic has been embedded. Where a reverse proxy has been detected, the client can modify the addressing of subsequent requests to the server using information required by the reverse proxy to ensure that the requests are routed to the proper server.

Figure 1:
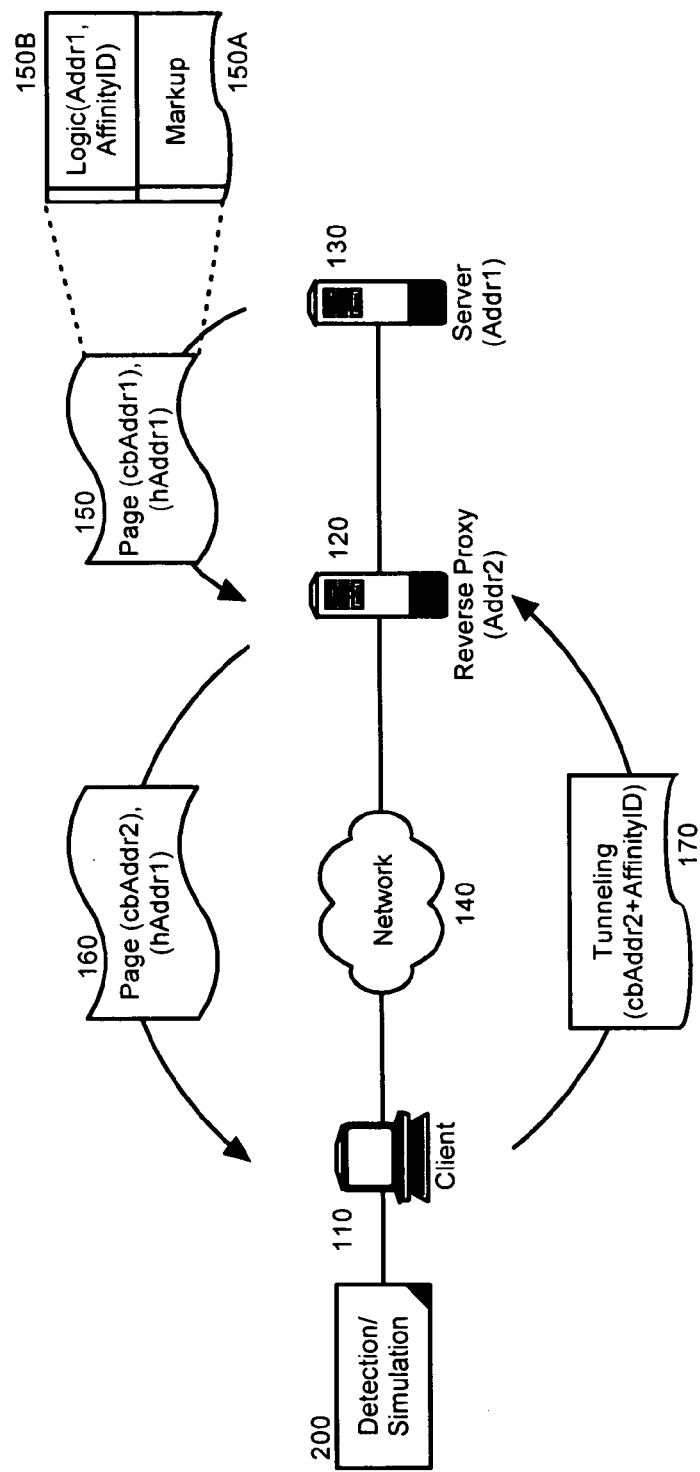
FIG. 1 is schematic illustration of a system for detecting a reverse proxy and establishing a tunneled connection therethrough; and, FIG. 2 is a flow chart illustrating a process for detecting a reverse proxy in the system of FIG. 1.

FIG. 1 is schematic illustration of a system for detecting a reverse proxy and establishing a tunneled connection therethrough. The system can include a client 110 and a server 130 configured for communicative coupling across a data communications network 140. The client 110 can include content browsing software (not shown) for accessing the server 130 by specifying a network address associated with the server 130. The client 110 further can include a virtual machine configured for processing logic embedded within content retrieved from the server 130. Importantly, the client 110 can yet further include a detection/simulation process 200 for detecting a reverse proxy 120 disposed in the communication path between the client 110 and the server 130, and for simulating a persistent connection between the client 110 and the server 130.

The server 130, by comparison, can include logic for distributing content requesting clients including the client 110. The content can include markup language specified documents, as well as computer program logic, such as embedded applets as is well known in the art. The server 130 can serve the content to requesting clients upon receiving a properly addressed request for specific content within the control of the server 130. Additionally, the server 130 can access a database management system (not shown) to further incorporate within a response to a client request, data stored within the database management system.

In a preferred aspect of the invention, the server 130 can be a collaborative application which can support network conferencing known in the art as Web conferencing. As an example, the server 130 can be a Lotus Sametime® server for managing real-time Web conferences between clients disposed about the data communications network. The Lotus Sametime™ suite of products is manufactured by the Lotus Software division of International Business Machines Corporation of Armonk, N.Y., United States.

In the system illustrated in FIG. 1, a reverse proxy 120 can be disposed within the communications path between client 110 and server 130. Accordingly, to access the server 130 residing at network address Addr1, an external network entity such as the client 110 must specify the reverse proxy 120 at network address Addr2. As an example, in the context of the Internet Protocol, Addr1 can be sametime.ibm.com and Addr2 can be proxy.ibm.com. Thus, to access the home page of the server 130 where the server is a Sametime® server, in the absence of the reverse proxy 120, the client 110 would specify in the context of the hypertext transfer protocol (HTTP) or in the context of the secure HTTP (HTTPS) the URI sametime.ibm.com/stcenter.nsf preceded by the protocol indicator "http[s]:".

Yet, in the presence of the reverse proxy 120, the client 110 would specify http://proxy.ibm.com/sametime/stcenter.nsf where the alias "sametime" is a server affinity identifier for the server 130. In this regard, in the presence of the reverse proxy 120, the client 110 only will connect to the reverse proxy 120 rather than the server 130 because the requests emanating from client 110 will be routed to the server 130 and the reverse proxy 120 will appear to the client 110 as the actual host. To ensure that a persistent connection can be simulated to support the exchange of real-time data between client 110 and server 130, however, it will be imperative that the client 110 remain aware when a reverse proxy 120 exists between the client 110 and the server 130.

More specifically, to ensure a persistent connection between the server 130 and the client 110, the reverse proxy 120 must be directed to the server 130 each time a request from the client 110 is handled by the reverse proxy 120. Hence, the client 110 must specify the server 130 within each request by way of a server affinity identifier or an alias for the server 130. Proxy rules disposed within the reverse proxy 120 can correlate the server affinity identifier with the specific host address of the target server. As an example, in a simple configuration the reverse proxy can be configured to route requests addressed to proxy.ibm.com/sametime/ to sametime.ibm.com, while the reverse proxy can be configured to route requests addressed to proxy.ibm.com/lvc/ to lvc.ibm.com where both sametime and lvc represent affinity identifiers for the respective servers.

Notably, to accommodate the selective use of the server affinity identifier when a reverse proxy 120 has been detected, it can be helpful to ensure that addresses disposed within the content 150 (and modified content 160) incorporate relative and not absolute pathways to the referenced resource. In this regard, as the reverse proxy 120 can re-write addresses disposed within the content 150 to accommodate proxy rules for re-routing incoming requests to the server 130, absolute addresses can complicate and inhibit the proper correlation between an address translated by the reverse proxy 120 and a proper address where the resource can be located within the server 130. Specifically, absolute addresses are not configured to incorporate aliasing required by the reverse proxy 120 to associate the server 130 with a specified server affinity identifier. Relative addresses, however, can be easily concatenated with re-written addresses to properly translate incoming requests to specific locations of resources within the server 130. Importantly, by relative addressing, it is meant that an address can be specified relative to a variable location and not in respect to an absolute anchor.

In any case, it will be recognized by the skilled artisan, however, that including a server affinity identifier within a request in the absence of the reverse proxy 120 can result in a nonsensical address. Hence, it can be important to include server affinity data within a request only when a reverse proxy 120 has been detected. To that end, the detection/simulation process 200 of the client 110 can inspect content 160 retrieved from the reverse proxy 120 to determine whether a reverse proxy 120 is present. Specifically, when the server 130 provides content 150 to the reverse proxy 120 for delivery to the client 110, the content 150 can include both markup 150A and logic 150B.

Notably, the logic 150B can be an applet, dynamically defined markup such as dynamic HTML (DHTML), a Visual Basic script (VBScript), or other such active logic which can be embedded within markup and which can retrieve remotely disposed logic through the specification of a network address or file path. The logic 150B can include specified configuration parameters such as the address from which the code base for the logic 150B can be retrieved, as well as a base address for the host providing the markup 150A—namely, the server 130. Importantly, the affinity identifier for the server 130 also can be included in the content 150 delivered to the reverse proxy 120. Finally, it is important to recognize that the process of detecting a reverse proxy and simulating a tunneled connection therethrough can be de-activated simply by incorporating a tag within the logic 150B which disables the detection/simulation logic 200.

Returning now to FIG. 1, the reverse proxy 120, in turn, can route the content 160 (now in modified form) to the client 110. In the modified form, the content 160 can give the appearance as of the reverse proxy was the content server fulfilling the role of the server 130 without the knowledge of the client. In this regard, the host address associated with the content 160 served to the client 110 will reflect that of the reverse proxy 120 and not that of the server 130. Nevertheless, the detection/simulation process 200, by comparing the addressing of the content 160 with the addressing of the code base for the logic disposed within the content 160, can determine if a reverse proxy 120 is present. In particular, where the addresses differ, it will be presumed that a reverse proxy 120 is present. Once it has been determined that the reverse proxy 120 is present, the detection/simulation process 200 can engage in HTTP tunneling through the reverse proxy 120 by specifying the server affinity identifier in HTTP requests 170 to the reverse proxy 120.

Figure 2:
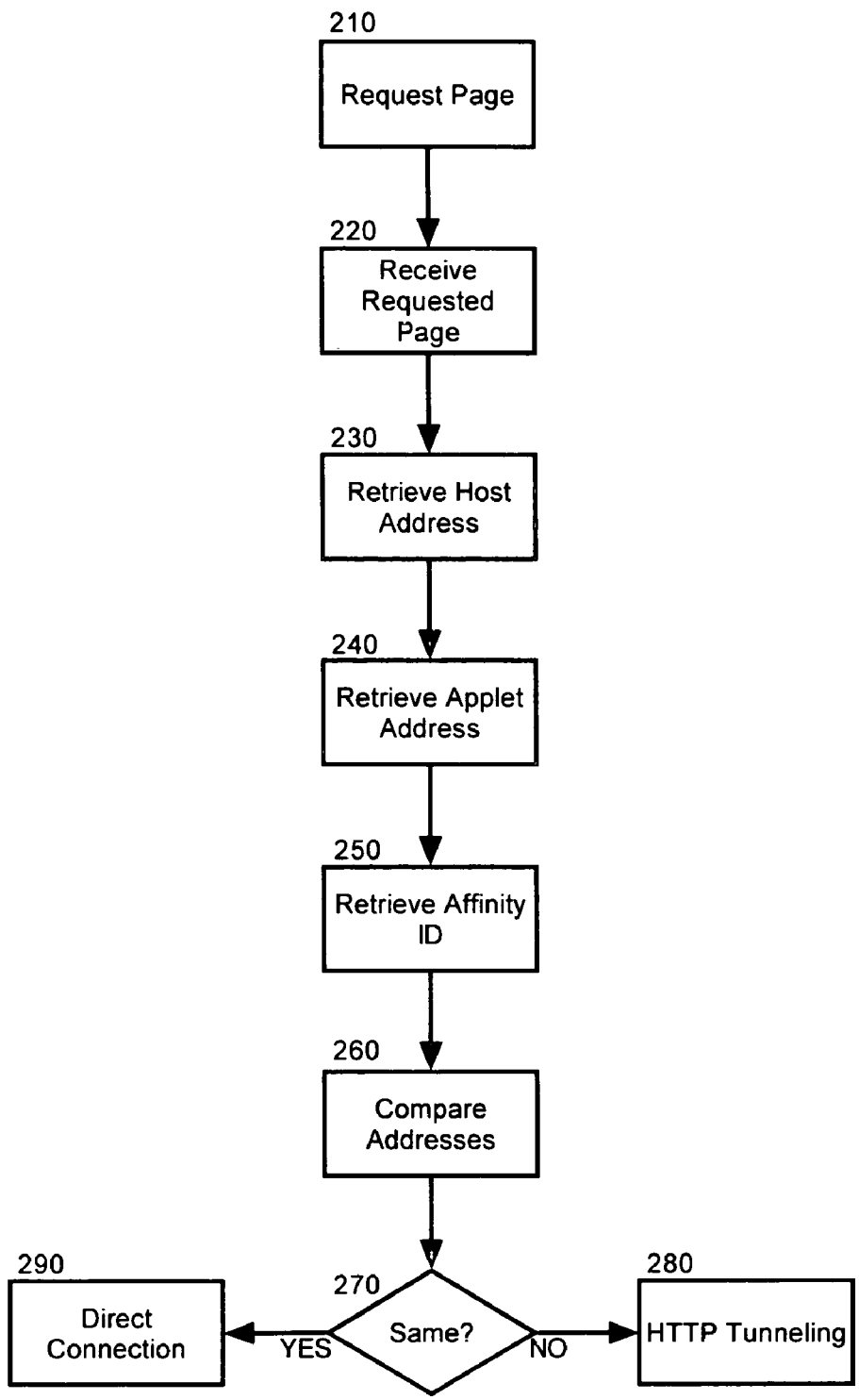

In further illustration of the operation of the detection/simulation process 200 of FIG. 1, FIG. 2 is a flow chart illustrating a process for detecting a reverse proxy in the system of FIG. 1. Beginning in block 210, a page can be requested and in block 220, the requested page can be received. At the outset, it can be presumed that the requested page had been served by the content source of the page and not by an intermediary such as a reverse proxy. In any case, in block 230 an HTTP host address can be retrieved from the received content. The HTTP host address can specify the actual hostname of the server from the perspective of the server that generated the received content. The HTTP host address can be located in a number of ways, including from tag data disposed within the content.

In addition to retrieving the host address in block 230, in block 240 a codebase address can be retrieved for a code base supporting the embedded logic. The codebase address can include the address upon which the client 110 relies to load the embedded logic for execution in the client 110. The codebase address typically can be acquired from within the embedded logic itself and can include a protocol, hostname and port. Additionally, a server affinity identifier can be retrieved from the received content in block 250. The affinity identifier is a unique value that must be used within the address path of any request sent through the reverse proxy to the server. More specifically, the affinity identifier can provide a mechanism for the reverse proxy to route the requests to a specified server coupled to the reverse proxy, but hidden from view of the client.

In block 260, the host address can be compared to the codebase address. In block 270 it can be determined if the host address differs from the applet address. If not, in block 290 it can be presumed that the client can access the server directly and a direct connection can be established between client and server. In this instance, a persistent HTTP connection can be simulated through HTTP tunneling directly with the server without having to first pass through the reverse proxy. However, where the addresses differ as determined in block 270, in block 280 a persistent connection can be simulated through the reverse proxy by incorporating the server affinity identifier in subsequent HTTP tunneling requests. In this way, the server affinity identifier can guide the reverse proxy to maintain a persistent connection with the server though the server has not been exposed to the client.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for managing an interposed reverse proxy comprising the steps of:
   comparing within a markup language document, a host address for said markup language document and a codebase address for a code base supporting logic disposed within said markup language document;
   if said host address and said codebase address differ, concluding presence of a reverse proxy obscuring from view a server source of said markup language document;
   retrieving a server affinity identifier for said server source; and
   responsive to said conclusion, attempting a tunneled connection to said server source through said reverse proxy by inserting said server affinity identifier in an address specified in said attempt.

2. The method of claim 1, wherein said retrieving step further comprises the step of locating said server affinity identifier within a tag disposed within said applet.

3. The method of claim 1, wherein said attempting step comprises the steps of:
- combining an address for said reverse proxy with said server affinity identifier and a string specifying a particular desired resource within said server source;
- forming a hypertext transfer protocol (HTTP) compliant request using said combined address;
- encapsulating non-HTTP data within said HTTP compliant request; and,
- forwarding said HTTP compliant request to said reverse proxy.

4. A machine readable storage having stored thereon a computer program for managing an interposed reverse proxy, the computer program comprising a routine set of instructions for causing the machine to perform the steps of:
- comparing within a markup language document, a host address for said markup language document and a codebase address for a code base supporting logic disposed within said markup language document;
- if said host address and said codebase address differ, concluding presence of a reverse proxy obscuring from view a server source of said markup language document;
- retrieving a server affinity identifier for said server source; and,
- responsive to said conclusion, attempting a tunneled connection to said server source through said reverse proxy by inserting said server affinity identifier in an address specified in said attempt.

5. The machine readable storage of claim 4, wherein said retrieving step further comprises the step of locating said server affinity identifier within a tag disposed within said applet.

6. The machine readable storage of claim 4, wherein said attempting step comprises the steps of:
- combining an address for said reverse proxy with said server affinity identifier and a string specifying a particular desired resource within said server source;
- forming a hypertext transfer protocol (HTTP) compliant request using said combined address;
- encapsulating non-HTTP data within said HTTP compliant request; and,
- forwarding said HTTP compliant request to said reverse proxy.

* * * * *